July 3, 1956 W. S. KNOWLES 2,753,546

SIGNAL TRANSLATOR

Filed March 2, 1954 4 Sheets-Sheet 1

WILLIAM S. KNOWLES
*INVENTOR.*

BY Ralph K. Bonell

AGENT

WILLIAM S. KNOWLES
*INVENTOR.*

BY Ralph K. Borell

AGENT

WILLIAM S. KNOWLES
*INVENTOR.*

BY Ralph K. Bonell

AGENT

WILLIAM S. KNOWLES
*INVENTOR.*

BY Ralph K. Bonell

AGENT

United States Patent Office 2,753,546

Patented July 3, 1956

2,753,546

SIGNAL TRANSLATOR

William S. Knowles, Princeton, N. J., assignor to Applied Science Corporation of Princeton, Princeton, N. J., a corporation of New Jersey Application March 2, 1954, Serial No. 413,570

16 Claims. (Cl. 340—183)

This invention relates to multi-channel electrical telemetering systems for the transmission of variable data and it refers more particularly to means for translating the received data from one form of representation to another and for rendering the values thereof independent of changes in the characteristics of the data-handling means.

In telemetering systems, particularly such as are employed to transmit information over a high-frequency radio link from a guided missile or an airplane in flight to a ground station, two methods of multiplexing are in current use. One is a method of frequency division, whereby individual sub-carrier frequencies are assigned to the several channels, while the other is a method of time division, whereby use of the common transmission path is assigned in repeated sequence to the several channels and the respective signals transmitted over said channels are identified in the received composite signal according to their relative positions therein.

The translator of the present invention is adapted to operate in conjunction with or to constitute a component of the latter type of system, more specifically, one in which the data signals which modulate the radio-frequency carrier of the common transmission link and which are recovered at the receiver, are in the form of pulse duration modulation (PDM) signals. The translator converts such PDM signals, as they appear in the output of the receiver, to amplitude modulated D. C. signals and in the process provides compensation for drifts in the values of such quantities as apparatus sensitivity and zero signal level. This compensation is controlled by other PDM calibration signals representing instantaneous full scale and zero values of the data, respectively, transmitted, individually, over a pair of channels reserved for this purpose, so that one of each of said calibration signals is included in each sequence of multiplexed channel signals.

It is an object of the invention to provide in a telemetering system means for the acceptance of a signal representing a sample of information defined by the duration of a pulse and the conversion thereof into another signal defined by a D. C. voltage level measured from an adjustable reference and in accordance with an adjustable scale.

It is another object to provide means for the control of said adjustable reference and adjustable scale in accordance with information defined by the respective durations of a pair of other pulses.

It is another object to provide in a telemetering system comprising a plurality of transmission channels, each employing pulse duration modulation (PDM) signals to modulate a common radio frequency carrier for transmission between transmitting and receiving stations, means for individually translating the received PDM signals of the several channels to amplitude modulated D. C. signals.

It is a further object to provide in a time-division multiplex telemetering system in association with translating means of the above character, means furnishing a continuous signal calibration automatically compensating for variations of the transmitted signals not representing data variations, including channel means independent of the data channels for the transmission of calibration information.

Other objects and advantages of the invention will be apparent upon consideration of the following description of a preferred embodiment thereof, taken in conjunction with the drawings in which.

Figures 1, 2, 3, 4:
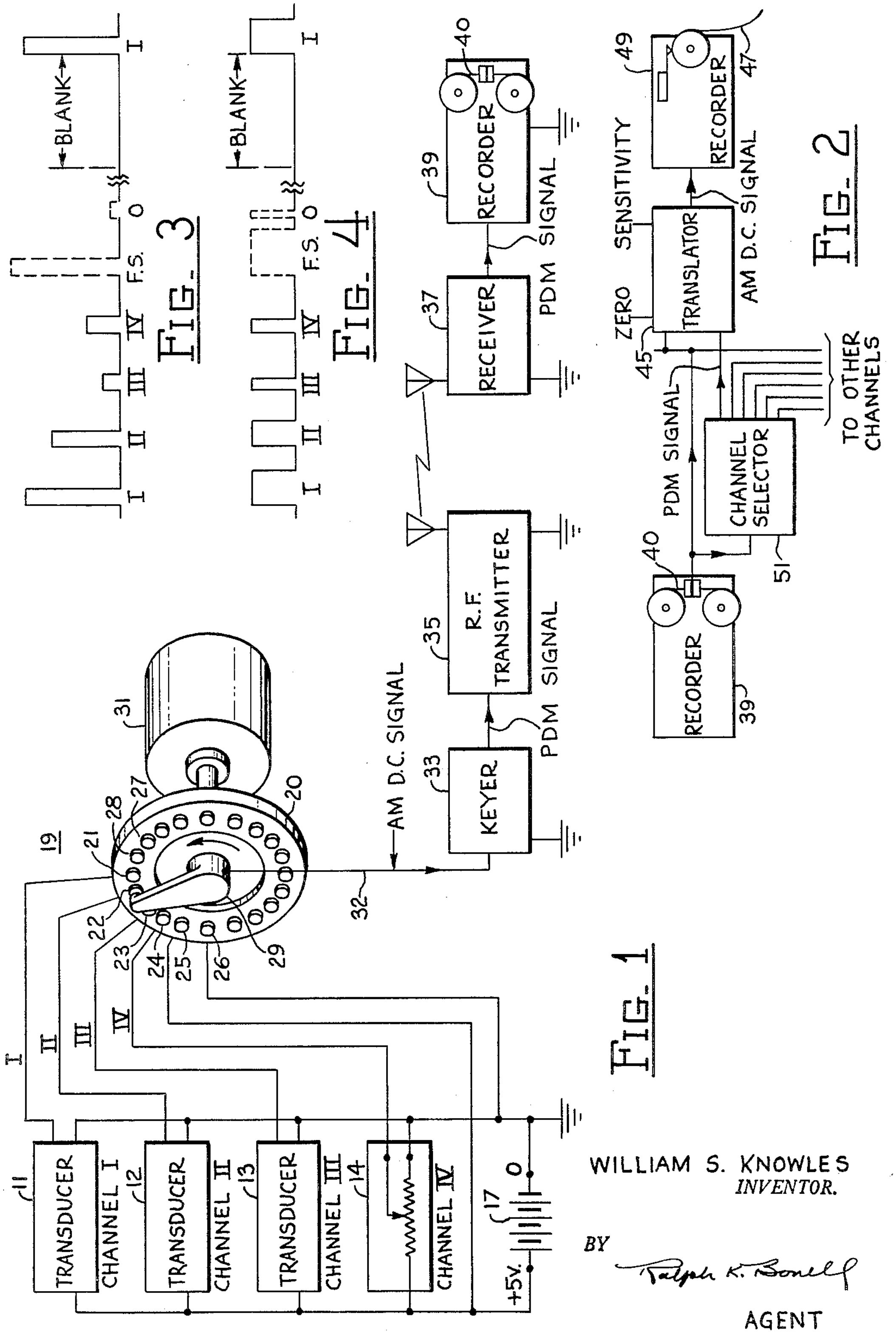
Fig. 1 is a circuit diagram of a type of time-division multiplex telemetering system with which the translator of the invention is adapted to operate, showing certain components thereof in block form.
Fig. 2 is a circuit diagram, in block form, of signal conversion means associated with the system of Fig. 1, including the translator of the invention.

Fig.' 3 and Fig. 4 are diagrams of wave forms appearing in the system of Fig. 1.

Figure 5:
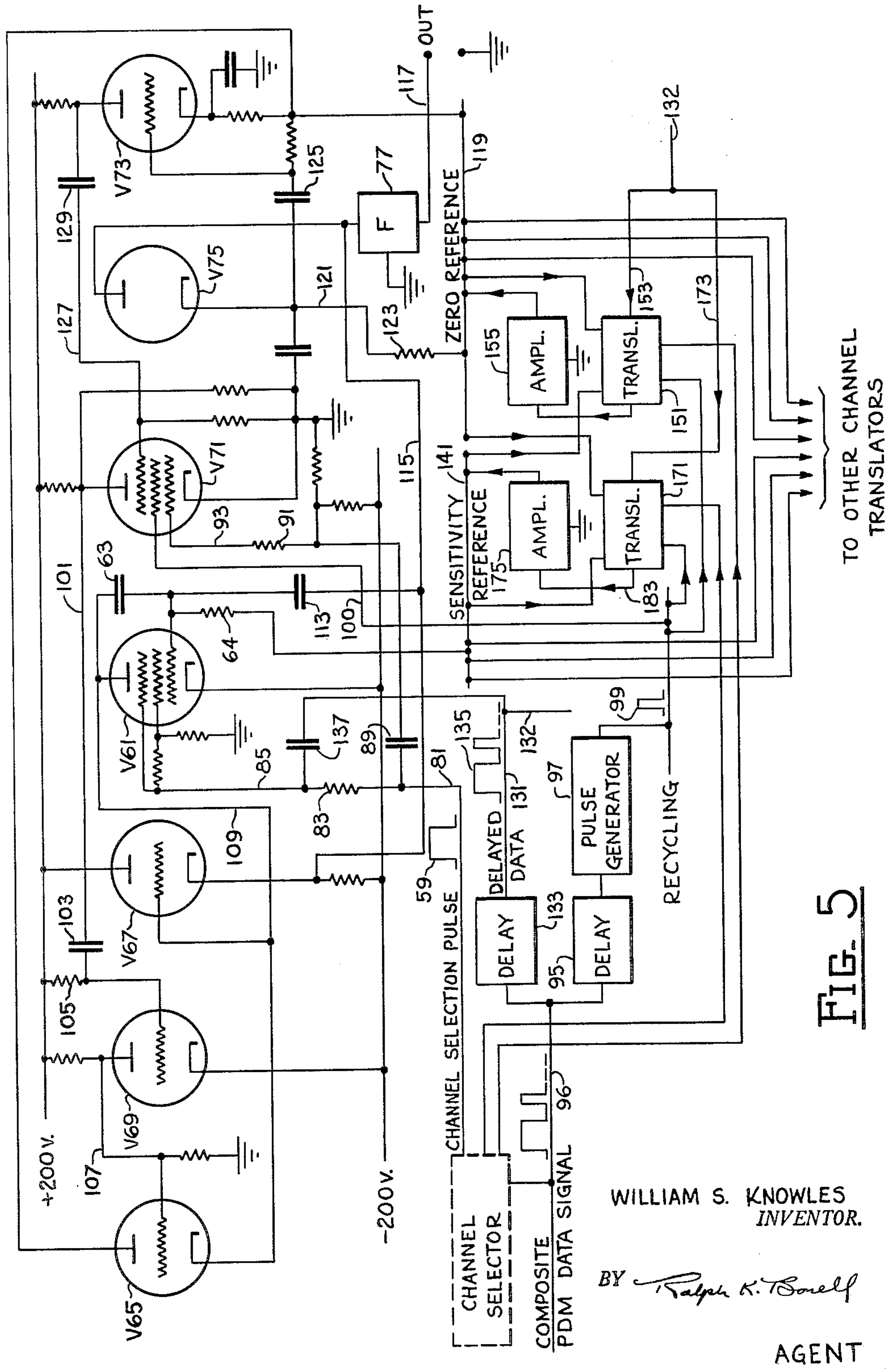

Fig. 5 is a circuit diagram of one form of the translator of the invention, together with means cooperative therewith.

Figures 6A, 6B, 6C:
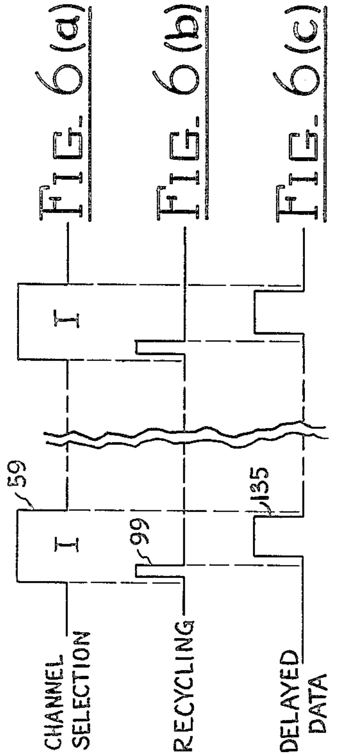

Figs. 6(*a*) and 6(*b*) and 6(*c*) are wave form diagrams of signals supplied to the translator of Fig. 5.

Figure 7:
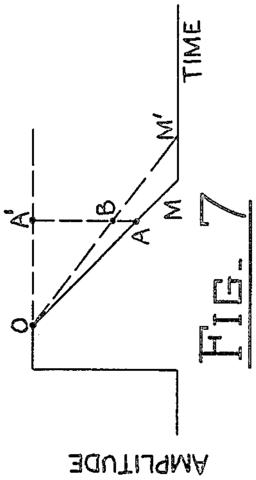
Figure 8:
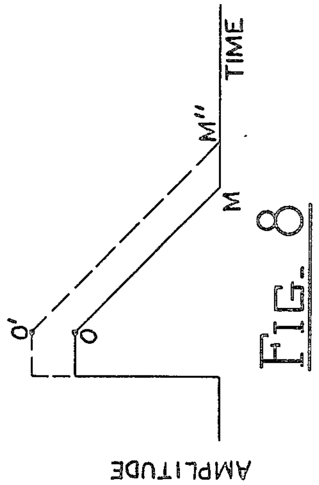

Fig. 7 and Fig. 8 are wave form diagrams, for purposes of explanation.

Figure 9:
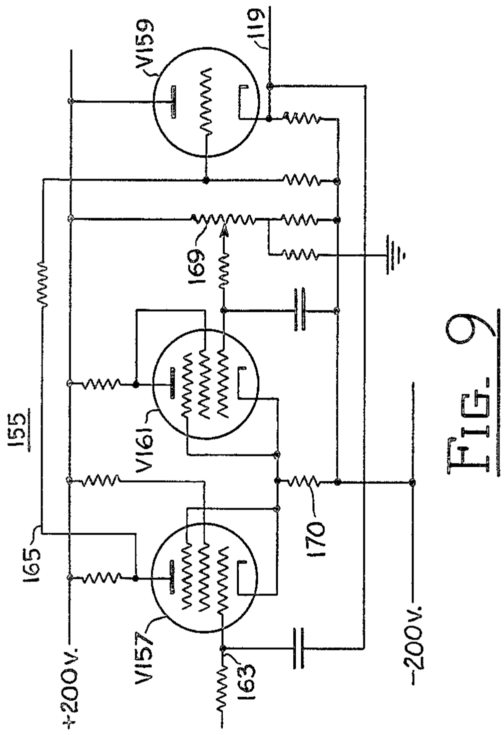
Figure 10:
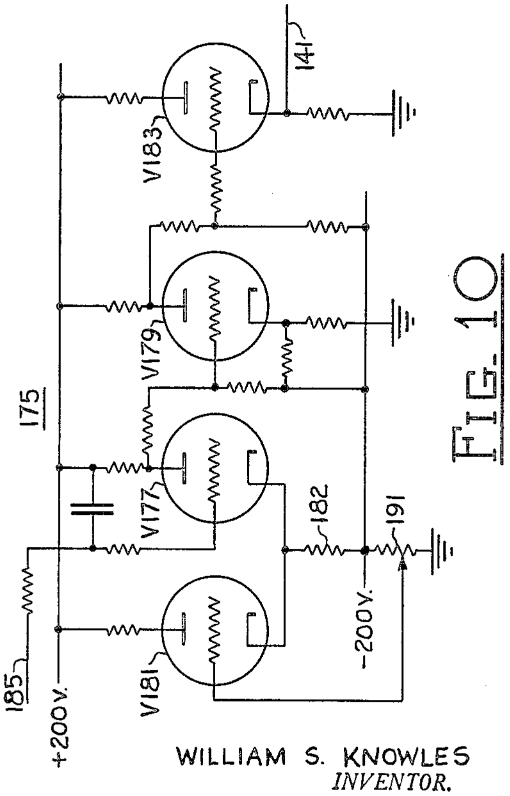

Fig. 9 and Fig. 10 are circuit diagrams of D. C. amplifiers shown in block form in Fig. 5.

Figure 11:
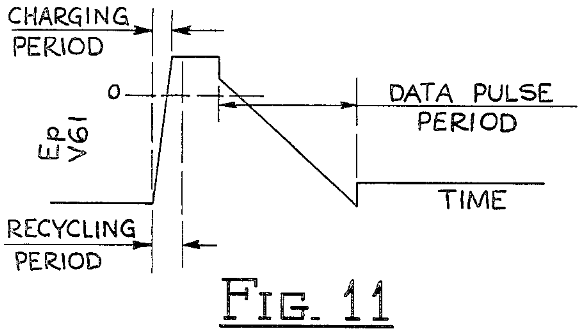

Fig. 11 is a wave form diagram of the plate potential of an electron tube shown in Fig. 5.

Figure 12:
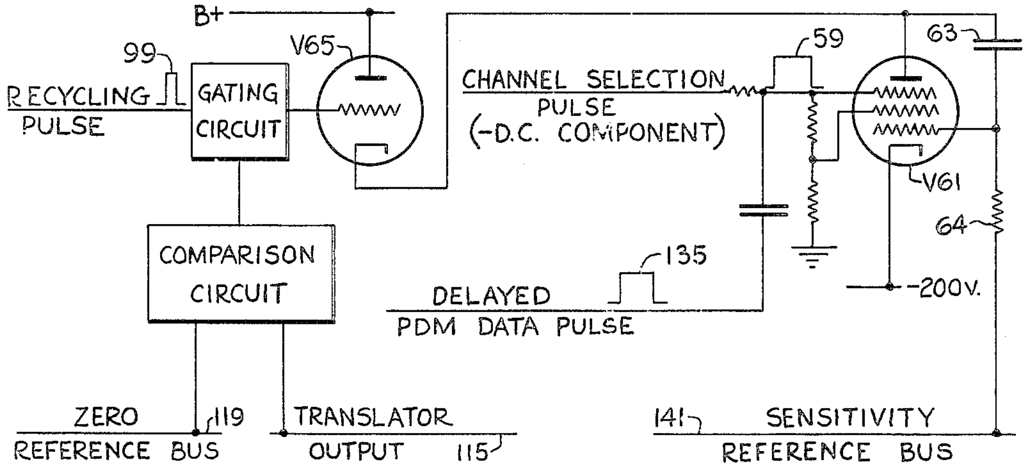

Fig. 12 is a simplified partial circuit diagram derived from the circuit diagram of Fig. 5, for purposes of explanation.

Figure 13:
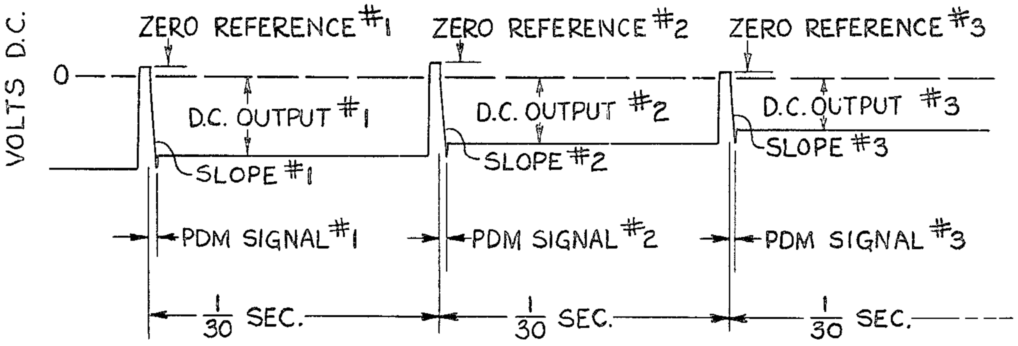
Figure 14:
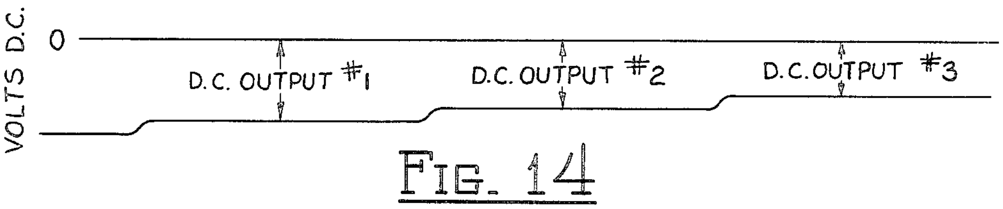

Fig. 13 and Fig. 14 are diagrams of wave forms appearing in the circuit of Fig. 5.

*The telemetering system, general*

By way of illustration of the type of system in conjunction with which the translator of the invention is adapted to operate, there is shown in Fig. 1, a schematic form, the circuit arrangements of a multiplex telemetering system employing PDM signals for the modulation of a high-frequency carrier transmitted over a radio link between transmitting and receiving stations. Means providing four data channels, only, are illustrated, it being understood that, in practice, a much larger number of channels usually will be employed. In addition to the data channels, means providing a channel for transmitting full-scale information, termed herein a sensitivity reference channel, and a zero reference channel are shown.

In guided missile and like investigations, physical quantities whose variable values are to be transmitted over a telemetering system, usually are first converted by appropriate transducers to D. C. voltages, variable over a range of 0 to +5 volts, the conversion, in general, being a linear one. In Fig. 1 tranducers or pick-ups 11–14 incl., supply such amplitude modulated D. C. signals, derived from a plurality of data sources, to data channels I–IV, incl. respectively. It is assumed herein, by way of illustration of the type of calibration that may be required in such a system, that the transducer elements, or the circuits associated therewith, require excitation in the form of an applied voltage, as is the case with potentiometer-connected instruments which type is shown for pick-up 14, and that their respective outputs while primarily proportional to the actuating quantities are also affected by variations in the value of this voltage. The excitation for the pick-ups of Fig. 1 is shown as supplied by battery 17, having a nominal five volt rating but whose output voltage is susceptible of change with age, variations in drain, etc. The battery voltage is considered herein to represent the full-scale value of the D. C. data signals developed by the pick-ups, which, therefore, also is a variable.

The signal outputs of picks-ups 11–14, incl., are sampled in sequence and at regular intervals by rotary switch 17 comprising stationary plate 20 bearing a plurality of circularly-arranged, uniformly-spaced contacts, 21–28, incl., together with rotatable contact arm 29 cooperative therewith. Arm 29 is driven at a constant speed in the direction of the arrow by motor 31. Stationary contacts 21–24, incl., are connected, respectively, to the outputs of pick-ups 11–14, incl., while contacts 25 and 26 are connected by way of the pick-up excitation busses to the high (+5 volt) and low (ground) terminals of battery 17, respectively. The latter two contacts are shown, for convenience, as following the data channel contacts in the order in which they are swept over by arm 29. Their positions in the contact sequence are, however, immaterial. The remaining contacts on plate 20 are associated (by connections not shown) with other data channels, with the exception of contacts 27, 28 at the end of the sequence. These are left blank to provide a break or null signal, distinguishable by its duration from other switch output interruptions, which furnishes a time reference within the switching cycle.

Arm 29 is connected by lead 32 to circuit 33, termed a "keyer." This circuit produces, as an output, an impulse of fixed amplitude having a duration proportional to the amplitude of an instantaneously applied D. C. input thereto. The keyer thus is adapted to convert amplitude modulated D. C. signals to PDM signals. Such a keyer circuit is described in an article by H. M. Hill, Jr., in "Tele-Tech" magazine for December, 1952, entitled, "Miniature airborne telemetering system," and shown, particularly, in Fig. 12 thereof. The output of keyer 33 is connected to radio transmitter 35, of conventional design, wherein a high-frequency carrier is modulated, for instance frequency-modulated, by the PDM output signals of the keyer.

The equipment thus far described is comprised, in the case of guided missile telemetering, by a miniature airborne transmitter. At the ground station the PDM signals are recovered, as by receiver 37, and, when the data are not processed directly as received, a record of the composite multi-channel signal, comprising repeated sequences of data and calibrating channel signals each corresponding to one revolution of switch arm 29, is made by recorder 39, for example, on magnetic tape 40. Conversion of the tape-recorded PDM signals to amplitude modulated D. C. signals is accomplished by play-back of the tape record to a plurality of translators, as translator 45 (Fig. 2), comprising the novel features of the invention later disclosed herein. A graphic record of the amplitude modulated D. C. signal output of each data channel translator may then be made, as on record means 47 of pen recorder 49.

Individual translators are employed for each of the data and calibration channels and the application of the appropriate channel signals thereto is governed, in the illustrated system, by a channel selector 51 which receives the composite signal played-back by recorder 39 and by a process of counting from the cyclically occurring reference supplied by the referred-to null in each signal sequence, develops timing or gating impulses which serve to route the individual channel signals to the proper translators. The present invention is not concerned with channel selection in a multiplex system, or the means adopted therefor. However, an impulse which may be derived from such a selector for isolating the signals of a particular channel in the composite received signal will be assumed, in describing the operation of the translator, to be available, although the impulse may be obtained by the use of other means, such as synchronous commutator means.

The operation of the system of Fig. 1, briefly, is as follows: As switch arm 29 rotates over contacts 21–24, incl., voltages proportional to the instantaneous outputs of pick-ups 11–14, incl., are applied in sequence to keyer 31 and converted thereby to corresponding PDM signals. Inputs to and outputs from the keyer are illustrated in Figs. 3 and 4, respectively. Subsequently, as arm 29 passes over contact 25, the full voltage of battery 17 is applied to the keyer and a PDM pulse, as pulse 53 (Fig. 4) having a width or duration representing this voltage and hence representing full scale for the data transmitted approximately at that time, appears in the keyer output, this being one of the calibration impulses, the sensitivity reference signal. The other PDM calibration impulse, pulse 55 of Fig 4, is developed when arm 29 passes over contact 26, connected to the grounded terminal of the battery and the width or duration of this impulse represents zero transmitted datum value, this being the zero reference signal. The width of this last signal is caused to be something greater than zero, and varies, particularly as recovered at the receiver, with the transmission characteristics of the airborne equipment, especially as a result of changes of operating temperature and other conditions which affect the parameters of the vacuum tubes of keyer circuit 33. When arm 29 passes over the last two contacts, 27, 28, of the sequence, no PDM signal output keyer 31 appears, this break, or null signal, as has been mentioned, furnishing a time reference within the switching cycle. The modulation of the radio transmitter carrier and the recovery of the modulating signal at the receiver may be accomplished in conventional manner.

*The translator*

This circuit provides for the reconversion of the received PDM signals to amplitude modulated D. C. signals, either immediately on reception or after recording and at subsequent play-back. One translator is required for each channel, including the two calibration channels, when simultaneous translation of all data channel signals is desired. All translators may be of similar character.

The principle of operation of this unit, the circuit of which is seen in Fig. 5, may be explained with reference to Fig. 7. A circuit of the Phantastron type comprising a Miller integrator or linear sweep generator is employed to generate a wave-form similar to that illustrated in Fig. 7 which includes, as a part thereof, a linear segment OM of negative slope. A point A on OM will then represent a displacement OA′ along the horizontal time axis and a displacement A′A along the vertical amplitude axis, both measured from O as an origin, and the slope of OM may be expressed as $$S=\frac{A'A}{OA'}$$

If, then, the displacement OA′ along the time axis represents or is controlled by the duration of a PDM signal, the proportional change of amplitude A′A may be taken to represent an amplitude modulated signal of corresponding value, the proportionality factor being S, the slope of segment OM. By a change in this slope, illustrated by dashed line OB, the previously considered displacement OA′ along the time axis is caused to result in a different displacement A′B along the amplitude axis. The sensitivity of the conversion from PDM to amplitude modulated signals can thus be controlled by control of the rate of "run-down" of the generated wave. In addition, the origin of measurement O may be displaced vertically to provide an adjustable zero reference, as to O′ (Fig. 8).

In Fig. 5 the Phantastron-type circuit for the generation of a waveform similar to that of Fig. 7 comprises pentode V61 having the plate and control grid thereof coupled by condenser 63, termed a "storage" condenser. This condenser, in combination with resistor 64, is characteristic of the Miller circuit which supplies the Phantastron with a linear timing wave and which is described in detail in the book "Waveforms," v. 19, of the M. I. T. Radiation Laboratory Series, pages 195–197, and shown in Fig. 5.44 thereof.

In the circuit of the invention, the charging of condenser 63 is controlled by triodes V65 and V69 in a novel manner later to be described, this process corresponding to the usual charging of such a condenser through a resistor. Triode V67 operates as an output cathode follower. The functions of the remaining tubes and associated circuit elements of the translator will best be understood from the following description of the operation of the circuit thereof.

The events constituting the operating cycle of the translator will be described with particular reference to Figs. 6(*a*), (*b*) and (*c*), and to Fig. 11, the latter figure showing the variation in potential of the plate of pentode V61. To isolate the recurrent signals of a particular channel in their application to the translator, for example in the application of the signals derived from the play-back of tape record 40 to translator 45 (Fig. 2), a channel selection gating pulse is employed. Such a pulse, shown as a positive pulse referenced 59 appears, in two of its occurrences, in Fig. 6(*a*). The duration of this pulse is substantially the full period assigned to a single channel in the scheme of time division. The operating cycle commences with the appearance on lead 81 of the leading edge of such a pulse. This positive pulse, applied by way of resistor of resistor 83 and lead 85 to the suppressor grid of pentode V61, previously biased well below cutoff due to the steady D. C. component of the pulse, which is of the order of −300 volts, raises the potential of said grid to a value slightly below cutoff. Channel selection pulse 59 is also applied to the negatively biased control grid of pentode V71, by way of condenser 89, resistor 91, and lead 93, raising this grid to zero potential. The last-mentioned potentials of the suppressor grid and control grid of pentodes V61 and V71, respectively, represent the gating effect of the channel selection pulse.

After a delay of the order of 100 microseconds, provided by pulse delay circuit 95, which may be a monostable multivibrator, the leading edge of a PDM data pulse, appearing on input lead 96, actuates pulse generator 97, which may be another monostable multivibrator or like circuit, to generate a positive pulse, referred to herein as a "Recycling pulse" and shown in Fig. 6(*b*) as pulse 99. The duration of the recycling pulse determines the duratoin of the recycling period, indicated on Fig. 11, during which the condition of the circuit is changed from that in which it was left after the translation of a previous signal to one suitable for the translation of the next signal. Recycling pulse 99 is applied to the screen grid of pentode V71 by way of lead 100 and, with the suppressor and control grids at zero bias, the increase in the potential of the screen causes a flow of plate current, thereby reducing the potential of plate lead 101 and applying a negative impulse to the grid of triode V69, by way of condenser 103.

Triode V69, as noted, is one of the two tubes directly controlling the charging of storage condenser 63. Prior to the advent of the last-mentioned impulse this tube was conducting heavily due to the return of the grid to the +200 volt bus, by way of grid resistor 105. The above-mentioned negative impulse applied to the grid stops the flow of plate current and the potential of plate lead 107 rises sharply. This positive impulse is applied to the grid of triode V65, previously non-conducting, and the resulting plate circuit current flowing in cathode lead 109 results in the charging of condenser 63, one terminal of which is connected to lead 109, starting from the condition in which it was left as a result of previous cycling. The charging of condenser 63 is accompanied by a rise in the potential of the terminal thereof connected to the plate of pentode V61 and lead 109, the potential of the opposite terminal connected to the control grid of V61 remaining unchanged due to the "clamping" effect of the grid current flowing in resistor 64. This rise in the plate potential of pentode V61 during the charging of condenser 63 is seen in the portion of the curve of Fig. 11 designated "Charging period."

At the same time that condenser 63 is charged by the plate current of V65, condenser 113 receives a charge determined by the potential of cathode lead 115 of cathode follower V67. As in the case of condenser 63, the potential of the terminal of condenser 113 connected to the control grid of V61 remains unchanged, while the potential of the opposite terminal varies with the charge. The potential of lead 115 corresponds to the output voltage of the translator appearing on lead 117, with such minor modifications as may be introduced by filter 77, to be referred to later, and, due to the operation of V67 as a cathode follower, is proportional to the plate voltage of V61, shown in Fig. 11. Unless otherwise restricted, the term "output voltage" herein does not discriminate between the potentials of leads 115 and 117.

In accordance with the principles of the invention an adjustable zero reference is provided for the translator output signals. This is represented by the potential of zero reference bus 119 controlled in accordance with the signals of the zero reference channel, in a manner described in the next section of this specification. At this point the variable character, only, of the potential of bus 119 will be noted. Diode V75 is connected between the cathode of triode V67 and zero control bus 119 by way of leads 115, 121 and resistor 123, to effect a comparison between the potential of lead 115 and that of bus 119. When the potential of lead 115 exceeds that of bus 119, conduction occurs through diode V75 and, due to the resulting voltage drop across resistor 123, the cathode potential of this tube rises sharply. This positive impulse is transferred by way of condenser 125 to the grid of triode V73, normally biased nearly to cut-off, causing plate current to increase in this tube. The negative impulse constituted by the resulting drop in potential of plate lead 127, applied by way of condenser 129 to the suppressor grid of pentode V71, stops the flow of plate current in this tube and the rise in potential of plate lead 101 thus brought about, as applied to the grid of triode V69 by way of condenser 103, causes this triode again to conduct heavily and lower the potential of lead 107 sufficiently to stop conduction in V65 and thereby stop the charging of condenser 63, to end the recycling period. In this manner, prior to the occurrence of each data signal the plate potential of V61 is adjusted to a level, above the zero voltage level indicated by a dashed line in Fig. 11, determined by the zero reference signal. This positive voltage represents the value to be subtracted from the data signal to compensate for the (variable) zero value thereof.

If diode V75 and associated means are considered to provide a comparison circuit for detecting a rise in the potential of lead 115 over that of bus 119 during the recycling period, pentode V71 and the various means actuated thereby may be looked upon as a gate through the instrumentality of which conduction in V65 is started by the recycling operation and stopped by the operation of said comparison circuit.

After the recycling period has ended and a short interval has been allowed as a safety factor, the leading edge of one of the positive PDM data pulses of the composite received signal appears on lead 131. The pulse, on this lead, is termed a "Delayed data" pulse and is referenced 135 in Fig. 6(*c*). This is derived from the original data pulse, previously referred to, applied to input lead 96 as a component of the undelayed composite signal, by the introduction of a time delay in circuit 133. The leading edge of pulse 135 is applied to the suppressor grid of pentode V61 by way of condenser 137 and the joint effect of this increased positive potential and the previously existing potential due to channel selection pulse 59 is to drive the suppressor to zero bias and allow plate current to flow. The selection of a desired component of the composite signal through the gating effect of the channel selection pulse will be apparent. Flow of plate current drops the potential of plate lead 109 which drop is communicated to the control grid by way of condenser 63. Initially, a nearly instantaneous drop of a few volts in the plate and control grid potentials of V61 occurs, this slight negative step being shown, somewhat exaggerated, in Fig. 11 (in the case of the plate potential) at the start of the "Data pulse period." The control grid of V61 thus is brought from zero bias nearly to cutoff. A stable condition is reached when the plate current corresponding to the control grid potential charges condenser 63 at the same rate at which the condenser discharges through resistor 64.

After this initial adjustment is completed, the significant "run-down" period commences, the data pulse period of Fig. 11, during which interval the plate potential of pentode V61 decreases at a very nearly linear rate. The negative slope of this straight-line segment of the plate potential curve is determined by the time constant of the combination of condensers 63, 113, and resistor 64, this being a fixed factor, and also by the variable potential of sensitivity reference bus 141, to which resistor 64 is connected, and which potential, in turn, is controlled by the duration of the PDM signals received over the sensitivity reference channel, as will also be described in the next section. Run-down continues until the trailing edge of the delayed PDM data signal appears on lead 131. This negative impulse drops the potential of the suppressor grid of pentode V61 to cutoff, thereby terminating the flow of plate current. The discharge of condenser 63 ceases, the control grid of V61 returns to zero bias due to current through resistor 64 thus producing the slight positive step shown at the completion of run-down. This is substantially equal to and cancels the effect of the negative step just prior to the start of run-down. Therefore, further consideration of these transients will be omitted herein, in the interest of simplicity of explanation. Condenser 63 holds its final charge until the next recycling operation and the D. C. output voltage of the translator remains constant during this interval (Figs. 13 and 14).

The effects of the potentials of zero reference bus 119 and sensitivity reference bus 141, respectively, on the operation of the translator will be described, and a summary of the operation of this circuit given, after the means for controlling said potentials have been described.

*Zero and sensitivity adjustment*

The zero reference signals transmitted to the receiving station when arm 29 passes over contact 26 of switch 19 (Fig. 1) are assumed herein to be selected in a translator circuit from the received delayed composite signal, available as a result of the play-back of tape record 40, by channel selection means, as in the case of the data signals and as indicated in Fig. 5. As PDM signals, their respective widths are utilized to determine the potential of zero reference bus 119 which thereby receives an adjustment for each group of data samples transmitted during a revolution of switch arm 29.

The signals in PDM form, selected from the composite signal appearing on lead 132, branched from delayed data lead 131, are first converted to amplitude modulated D. C. signals by zero reference channel translator 151, which may be identical with the data channel translators partially described above. In correspondence with said other translators, translator 151 is itself subject to zero control in accordance with the potential of bus 119, the operation being in this respect a regenerative one. It also is subject to sensitivity correction provided for the signals of all channels by the sensitivity reference signal, in the manner described below. The amplitude modulated D. C. signal output of translator 151 is applied to D. C. amplifier 155, the circuit of which is seen in Fig. 9, which supplies a D. C. output voltage proportional to the relationship of the signal input thereto to an adjustable reference voltage. Amplifier 155 comprises pentode V157, functioning as a voltage amplifier, and triode V159, functioning as a cathode follower. Pentode V161 also is used as a cathode follower and provides an adjustment of the cathode potential of V157, as later described.

In the operation of amplifier 155, assuming the input to be a positive pulse of suitable constant amplitude, the application of this pulse to the control grid of V157, negatively biased by the steady D. C. component of the signal, raises the potential of the grid and allows plate current to flow in proportion to said amplitude. The resultant drop in potential of plate lead 165 is applied to the grid of V159 and is reflected, through cathode follower action, in a lowered potential of bus 119.

Thus, the D. C. output voltage of the amplifier, and the potential of bus 119, decreases as the amplitude of the input signal increases, and vice-versa. Potentiometer 169 provides the adjustable reference voltage above referred to which, by control of the potential of the control grid of V161, governs the plate current and the voltage drop across resistor 170 and hence the common cathode potential of V157 and V161. Variation of the cathode potential of V157 results in an amplitude variation of the potential applied to bus 119. Amplifier 155 is, in effect, a means for comparing a signal input thereto with a known value, the set voltage of potentiometer 169, and maintaining, through servo loop operation, an output in selected ratio thereto.

The effect of the variation in potential of zero reference bus 119 produced by the variable output of amplifier 155 is to raise or lower the point at which conduction occurs through the described comparison circuit comprising diode V75, for a given potential of lead 115. This effect is seen in Figs. 11 and 13.

Sensitivity reference signals, representing full-scale data, are transmitted to the receiving station when switch arm 29 passes over contact 25 (Fig. 1) connected to the +5 volt excitation bus of the transducers. These signals, selected from the composite received signal, control the potential of sensitivity reference bus 141 (Fig. 5). As in the case of the zero reference signals, the PDM sensitivity reference signals are first converted to amplitude modulated D. C. signals by application to a translator, itself having automatic zero and sensitivity adjustments. This is translator 171, having input lead 173, the output of which is applied to amplifier 175 for which a circuit diagram is given in Fig. 10. Amplifier 175, similar in function to amplifier 155, comprises triodes V177 and V179 functioning as D. C. voltage amplifiers, and triode V183 functioning as a power cathode follower. Triode V181, corresponding to V161 in amplifier 155, has in its grid circuit bias potentiometer 191 supplying a reference voltage with which the input signal is compared. Since V177 and V179 each produce a phase reversal, a variation in value of the signal input to the amplifier produces a variation in like sense of the voltage output and hence of the potential of sensitivity reference bus 141. Adjustment of potentiometer 191 controls the cathode potential of V177 in the manner described in connection with V161 of amplifier 155, except as to the two phase reversals introduced by V177 and V179.

The effect of variation of the potential of sensitivity reference bus 141 is to supply a higher or lower charging current to condensers 63 and 113, thus varying the rates at which charging occurs and hence the rates at which the respective potentials thereacross vary.

Considered more generally, the operation of zero reference amplifier 155 adjusts the origin of the linear sweep portion of the translator output wave vertically (along the voltage amplitude axis, so that as run-down occurs this level will be reached at a time determined by the duration of the current zero reference pulse.

If all translators are initially adjusted to have the same rate of run-down (i. e. the same RC time constant as determined by resistor 64 and condensers 63 and 113, with the sensitivity reference bus voltage assumed constant) control of the voltage amplitude at the initiation of run-down, as described, provides proportional control of the number of microseconds in this initial correction period. Thus, if a decrease in the duration of the zero reference pulse occurs, the output of the zero reference channel translator rises temporarily. This rise is amplified and inverted in amplifier 155 and the potential of bus 119 drops to a less positive value. Because of their dependence on the potential of bus 119, subsequent translator outputs occurring before the next readjustments will achieve the run-down to zero voltage level in fewer microseconds, and within the time represented by a few data samples the system is stabilized in accordance with the new parameters, the residual error at any instant being a function of the amplification of amplifier 155, as is the general condition of servo system operation.

In the operation of sensitivity reference amplifier 175, let it be assumed, for purposes of explanation, that the adjustment of the amplifier is such that a full-scale PDM signal produces a −100 volt D. C. translator output when this signal has a particular duration. If the transmitted sensitivity reference (full-scale) signal goes to a lesser value, the absolute value of full scale voltage becomes less than 100 volts. To correct this, amplifier 175 increases the potential of bus 141 so that run-down to −100 volts may occur in less time. Again the residual error is a function of amplifier gain.

*Summary of translator operation*

A summary of certain of the more important features and of the over-all operation of the translator, described in detail above, will now be given, with reference to the simplified partial circuit diagram of Fig. 12, included in the drawings for purposes of explanation, and to the wave diagrams of Figs. 13 and 14.

In preparation for the reception and translation of a PDM signal, a channel selection pulse applies a bias to the suppressor grid of Miller integrator or sweep generator pentode V61, to place this tube in condition to respond to a data signal later applied to the same electrode. Prior to the application of such a signal, a datum is established, the reference zero, from which the output D. C. signal of the translator is measured, downwardly, in proportion to the duration of the data pulse, as described in connection with Fig. 11. The bringing of the plate of V61 up to this reference potential is initiated by a recycling pulse applied, through intermediate means functioning as a gate, to the grid of V65 to permit this tube to conduct and thereby supply an adjustable value of current for charging storage condenser 63, this being one respect in which the circuit departs from other circuits of the Miller type in which the charging of such a condenser is through a resistor which governs the non-adjustable charging rate thereof. In addition to providing an adjustment of the charging rate, the use of triode V65 improves the linearity of the circuit characteristic.

The termination of conduction by V65 and hence the temporary fixation of the plate potential of V61 is controlled, through said gating means, by a comparison circuit shown in block form in Fig. 12, whereby during the charging of condenser 63 a comparison is made between the translator D. C. output voltage and the potential of zero reference bus 119. When the rising output voltage reaches the latter value, an impulse is applied to the grid of V65 which stops conduction therethrough and hence stops the charging of condenser 63. The plate potential of V63 is thus temporarily fixed at a value above the zero voltage level dependent upon the relationship of the value of the last received zero reference signal to a set reference which determines the potential of bus 119, and maintains said value until the subsequent appearance of the leading edge of a PDM signal on the suppressor grid lead of V61, which initiates run-down of the plate potential of this tube. This feature of an adjustable zero reference also distinguishes the circuit of the invention from other Miller circuits.

Having adjusted the potential of the plate of V61 at the start of run-down, the time during which run-down is allowed to continue is controlled by the duration of the input data pulse, the trailing edge of this pulse applied to the suppressor of V61, terminating the run-down operation and leaving the plate of V61 at a D. C. potential which represents the true value of the applied PDM signal, measured, downwardly, from the zero voltage level. The rate of run-down or slope of the plate potential curve of V61, and hence the time required to reach its terminal value, is controlled by connecting grid resistor 64 of V61 to sensitivity reference bus 141, the potential of which at any instant depends in described manner on the value of the last received sensitivity reference signal, in its relationship to a second set reference voltage. Here again the circuit departs from conventional arrangements of the Miller circuit.

What may be called the active or readjustment period of the operation of the translator, during which the D. C. output voltage is readjusted or modulated in accordance with the input signal value, and which is shown in detail in Fig. 11, is, in most cases, of short duration relative to the quiescent period during which this voltage remains unchanged and which corresponds to the time taken up by the signals of the other channels of the telemetering system (plus the null signal). This relationship is better seen in Fig. 12 where data sampling at a rate of thirty times a second is assumed, and where the "spikes" represent the periods of readjustment of the plate potential of V61 in the translator of a single channel. The duration of the entire readjustment period may be less than one millisecond. These transient disturbances are smoothed out by filter 77 (Fig. 5) and the negative output voltage of the translator, for data continuously decreasing in value, appears as in Fig. 14 where the successive steps in the curve represent amplitude modulated D. C. signals respectively proportional to input PDM signals, with applied zero and sensitivity corrections representing a substantially continuous automatic calibration of the telemetering system.

While certain preferred embodiments of the signal translator of the invention have been shown and described herein by way of illustration, the invention is not limited to such embodiments, the scope thereof being defined solely by the appended claims.

I claim:

1. In signal translator means for converting pulse duration modulation signals to amplitude modulated D. C. signals the combination of a source of PDM signals, sweep generator means having a voltage output characterized by a linear relationship between amplitude and time over a selected period and in departure from a selected origin comprising a first electron tube having a cathode and a plate together with control, screen and suppressor grids, means supplying bias potentials to said last two grids, a condenser connected between said plate and control grid, a resistor connected to said control grid, a first bus of variable potential and grid return means connecting said resistor to said bus to supply a variable bias to said control grid, the joint effect of said several grid biases throughout the range thereof normally preventing plate current flow in said tube, charging control means for said condenser comprising a second electron tube having a cathode, a grid and a plate, means supplying grid bias and plate potentials thereto, circuit means connecting the cathode of said second tube with the plate of said first tube, a second bus of variable potential, and means adjusting the grid potential of said second tube jointly in accordance with the potential of said second bus and said sweep generator output voltage to control plate current flow in the tube and thereby the charging of said condenser, means for applying a signal from said source to the suppressor grid of said first tube in suitable relation to said normal tube bias to cause plate current flow for the duration of the signal, initiation of said flow defining said origin and termination thereof defining the termination of said period, and signal circuit means actuated in accordance with the output of said generator.

2. In signal translator means for converting pulse duration modulation signals to amplitude modulated D. C. signals the combination of a source of PDM signals, sweep generator means having a voltage output characterized by a linear relationship between amplitude and time in departure from a selected origin and comprising a first electron tube having a cathode and plate together with control, screen and suppressor grids, means supplying bias potentials to said last two grids, a source of unidirectional potential, grid control means including a resistor connecting said control grid thereto, a condenser connected between said plate and control grid, a second electron tube having a cathode, a grid and a plate, means connecting said second tube in series with said first tube, means supplying grid bias and plate potentials thereto, means for varying the grid potential of said second tube for controlling plate flow therein and thereby the charging of said condenser, means for applying an input signal to the suppressor grid of said first tube, and output signal circuit means actuated in accordance with the plate potential of said first tube.

3. In signal translator means for converting pulse duration modulation signals to amplitude modulated D. C. signals, a source of PDM signals, sweep generator means having a voltage output characterized by a linear variation of amplitude with time over a selected period and in departure from a selected origin, means connected to said generator means for controlling the location of said origin in time and the termination of said period in accordance with the occurrences of the leading and trailing edges, respectively, of said applied signal, means for applying a signal from said source to said controlling means, a bus of variable potential, and means connected to said bus and to said generator means for controlling the ratio of amplitude and time during said period in accordance with the potential thereof.

4. In signal translator means for converting pulse duration modulation signals to amplitude modulated D. C. signals, a source of PDM signals, sweep generator means having a voltage output characterized by a linear variation of amplitude with time over a selected period and in departure from a selected origin, means connected to said generator means for controlling the location of said origin in time and the termination of said period in accordance with the occurrences of the leading and trailing edges, respectively, of said applied signal, means for applying a signal from said source to said controlling means, a bus of variable potential, and means connected to said bus and to said generator means for controlling the value of said voltage output at said origin in accordance with the potential of said bus.

5. In a circuit of the Miller sweep generator type characterized by a pentode electron tube having a condenser connected between plate and control grid thereof and a control grid resistor together with means furnishing operating biases for the remaining grids of the tube, a first bus of variable potential, grid return means connecting said resistor and said bus, a second electron tube having a cathode, a grid and a plate, grid bias and plate potential means therefor, circuit means further connecting said condenser in the plate circuit of said second tube to receive a charge due to a flow of current in said plate circuit, and means for applying a signal to the grid of said second tube to control said plate current.

6. In sweep generator circuits of the Miller type comprising a pentode electron tube having a condenser connected between the plate and control grids thereof and having said control grid connected to a source of unidirectional potential by way of a resistor a second electrol tube having a cathode, a grid and a plate, means supplying grid bias and plate potentials thereto, adjustable means for varying the grid potential of said second tube, and a connection between the cathode of said second tube and the plate of said first tube whereby the charging of said condenser is caused to be dependent on the flow of current in said second tube.

7. In a multiplex telemetering system including data channels and a pair of calibration channels, said last two channels transmitting zero and full scale data values as references for the calibration of received data signals, signal translator means for converting received signals from one form of representation to another, said means including a pair of means for varying the signal output thereof independently of the signal input thereto, and means controlling said last pair of means in accordance with information transmitted over said two calibration channels, respectively.

8. Translator means as claimed in claim 7 wherein the data signal input thereto is in the form of pulse duration modulation signals and the output therefrom is in the form of amplitude modulated D. C. signals.

9. In telemetering apparatus wherein recurrent PDM signals are developed respectively representing instantaneous values of variable data and which includes a source of calibration signals respectively associated in time with said data signals, signal translator means for converting said PDM signals to amplitude-modulated D. C. signals modified in accordance with the respective values of said calibration signals comprising means adapted to receive said PDM signals and producing an output D. C. voltage proportional to the duration of a signal input thereto including adjustable means for varying the sensitivity thereof, and means for adjusting said sensitivity means individually for each data signal in accordance with the value of the calibration signal associated therewith.

10. Signal translator means as claimed in claim 9 wherein said calibration signals are PDM signals.

11. Signal translator means as claimed in claim 9 wherein said calibration signals are PDM signals representing full scale data.

12. In telemetering apparatus wherein recurrent PDM signals are developed respectively representing instantaneous values of variable data and which includes a source of calibration signals respectively associated in time with said data signals representing a variable reference level therefor, signal translator means for converting said PDM signals to amplitude-modulated D. C. signals modified in accordance with the respective values of said calibration signals comprising means adapted to receive said data signals and producing an output D. C. voltage proportional to a signal input thereto, and means measuring the value of said output from said variable reference.

13. Signal translator means as claimed in claim 12 wherein said calibration signals are PDM signals defining the values of said data signals corresponding respectively to zero values of the primary data.

14. In apparatus for translating a periodically occurring variable PDM data signal appearing in a time division multiplex telemetering system to an amplitude modulated D. C. voltage the combination of a linear sweep generator circuit of the Miller type, the operating cycle of said generator comprising a recycling period, a data pulse period for the linear translation of a data pulse and a quiescent period, means for generating and applying to said circuit a recycling pulse to initiate said recycling period, means active during said period to adjust the D. C. voltage output of said circuit to a reference value, and means for subsequently applying a data pulse to said circuit to terminate said recycling period and initiate said data pulse period wherein according to the operation of the circuit said output voltage changes linearly with time, termination of said signal terminating said data pulse period and initiating said quiescent period.

15. Translator apparatus as claimed in claim 14 wherein means are provided causing the reference to which the output voltage is adjusted during the recycling period to be in accordance with information derived from a separate source of calibration data.

16. Translator means as claimed in claim 14 wherein means are provided for adjusting the scale of said linear voltage change relative to time in accordance with information derived from a separate source of calibration data.

References Cited in the file of this patent

UNITED STATES PATENTS 2,578,643 Hayslett -------------- Dec. 11, 1951

FOREIGN PATENTS 639,689 Great Britain ----------- July 5, 1950

OTHER REFERENCES

Electrical Engineering, vol. 69, Issue 5 pgs. May 1950 (5 pgs. 427–430).